United States Patent [19]
Martin

[11] 3,715,891
[45] Feb. 13, 1973

[54] POULTRY FREEZING PROCESS

[75] Inventor: Walter Harper Martin, San Antonio, Tex.

[73] Assignee: Refrigeration Engineering Corporation, San Antonio, Tex.

[22] Filed: Dec. 11, 1970

[21] Appl. No.: 97,298

[52] U.S. Cl. ............................62/63, 62/65, 62/78, 99/194, 99/197
[51] Int. Cl. ............................................F25d 13/06
[58] Field of Search..........62/62, 63, 78, 74, 65, 374, 62/375, 376, 380; 99/192, 197, 194

[56] References Cited

UNITED STATES PATENTS

| | | | |
|---|---|---|---|
| 1,828,877 | 10/1931 | Scot | 62/64 |
| 2,065,358 | 12/1936 | Zarotschenzeff | 62/64 |
| 2,817,957 | 12/1957 | Rowland | 99/194 X |
| 3,359,122 | 12/1967 | Zebarth et al. | 99/194 |
| 2,489,918 | 11/1949 | Menges | 62/380 X |
| 2,223,972 | 12/1940 | Sterling | 62/63 X |
| 2,385,140 | 9/1945 | Knowles | 62/63 |
| 2,967,405 | 1/1961 | Taylor | 62/63 X |

*Primary Examiner*—Meyer Perlin
*Assistant Examiner*—Ronald C. Capossela
*Attorney*—Watson, Cole, Grindle & Watson

[57] ABSTRACT

A poultry freezing process by means of which the natural moisture within poultry products is crystallized for preservation, the process being carried out by moving the products through a moisture-laden chamber maintained at a temperature of approximately 15° to 25°F. and thereafter passing air over the poultry products in the chamber at a low velocity for a period of from about 30 to 90 minutes thereby reducing the temperature of the poultry products to approximately 18° to 28°F. throughout.

4 Claims, No Drawings

POULTRY FREEZING PROCESS

This invention relates generally to a technique for freezing consumable meat products and more particularly to such a process wherein ice crystals are formed from the natural moisture within the products for the purpose of preserving same.

In the past, various techniques have been devised for chilling or freezing poultry and other consumable products so as not to affect their texture, flavor and appearance characteristics during handling from the processor to the ultimate consumer. Among such techniques are the chill-pack, the deep-chill, the dry-chill and other processes. With the chill-pack approach the poultry products are normally rapidly crust frozen so that any thawing of the products during shipment may result in leakage and drainage problems and, because the products are normally directly exposed to various types of refrigerants and to different bath solutions during freezing or chilling, packaging of each or several of the products before chilling is needed. Also, dehydration of the natural juices during most forced air freezing techniques also demands the use of packaging before freezing order to retain the moisture within the products. Furthermore, it has not been heretofore feasible to pre-cut the poultry products before crust-freezing for fear that an excessive amount of natural moisture will escape from the cut poultry before it can be frozen. These and other disadvantages are also shared by the other noted freezing techniques among them being the difficulty in packaging large numbers of poultry products in a single container because of the additional space required for these stiff and inflexible poultry products.

A return to the old technique used in preserving poultry products during shipping wherein the cartons were merely filled with ice surrounding each poultry product would perhaps remedy the packaging problem somewhat, but of course would significantly reduce the shelf-life of the poultry products and only increase the problems of drainage and leakage during thawing of the ice. Besides, health hazards and handling problems have discouraged widespread continued use of the ice packing approach.

With these various disadvantages borne in mind a poultry freezing process has been devised wherein both the advantages of the standard ice-pack technique and the crust-freeze process are available. For example, the natural bloom of the poultry products is retained without having to pack them in crushed ice or without having to crust-freeze them when prepared in accordance with the present invention. The poultry products which are chilled using the present technique may be packaged without the use of crushed ice and yet are sufficiently frozen without becoming stiff so that little space is wasted in the crate as with the crust-frozen products.

Accordingly, it is an object of the present invention to provide a poultry freezing process which retains the natural moisture within the poultry products by means of slowly crystallizing this moisture throughout.

Another object of this invention is to provide such a process wherein the dressed poultry products are slowly cystallized by moving them through a moisture-laden chamber maintained at a below-freezing temperature and thereafter slowly passing air over the poultry products at a low velocity sufficient to reduce the temperature totally throughout the poultry products to a freezing temperature slightly in excess of the temperature within the chamber thereby crystallizing the natural moisture within each of the poultry products.

A further object of the present invention is to provide such a process wherein the temperature within the moisture-laden chamber is maintained within the range of about 15° to 25°F.

A still further object of the instant invention is to provide such a process wherein the poultry products are reduced to a temperature of approximately 18° to 28°F. totally throughout.

A still further object of this invention is to provide such a process wherein the poultry products are subjected to the air passing thereover within the moisture-laden chamber for a period of from about 30 to 90 minutes.

Other objects, advantages and novel features of the invention will become apparent from the following detailed description of the invention.

Basically, the poultry freezing technique in accordance with the present invention involves the movement of dressed poultry products through a drip line for a period of time sufficient to permit any and all surface water to be drained from the birds. They are then moved through a moisture-laden chamber on a conveyor, for example, the interior of the chamber being maintained within the range of about 15° to 25°F. Air is thereafter passed over the birds at a low velocity for a period of from about 30 to 90 minutes whereby the surface temperature and internal temperature of each bird is reduced to approximately 18° to 28°F. The freezing of each poultry product, having taken place slowly, crystallizes the moisture within each bird rather than tending to draw out moisture from the bird and crystallizing it in the freezing chamber. Because a sufficient amount of moisture is maintained in the chamber, the natural moisture and juices within the birds are not evaporated during the freezing process. Instead, ice crystals are formed throughout each poultry product without tending to freeze them solid, the legs and wings remaining pliable since the temperature of each bird has not been reduced significantly below freezing. Also, by sufficiently draining the surface water off the birds before moving them through the chamber, any freezing of such surface water may be substantially avoided.

By slowly chilling the poultry carcass in such a manner it can be assured that chilling takes place evenly throughout the meat. The use of thermo-couples inside these carcasses has shown only an insignificant variance in temperature after freezing between the coldest part and the warmest part on any portion of the carcass. Slowly freezing the birds by the prevent freezing process improves the outward evidence of freshness or the bloom of each bird remarkably well. Also, since there is no need to use crushed ice in packing the birds for shipment, the overall weight of the packed birds is significantly reduced thereby resulting in a freight saving without the need to contend with leakage of the crates and drainage at either the shipper's loading platform or in his refrigerated truck. The birds which have been frozen in accordance with the present freezing process may be easily packaged in a smaller space so that a larger number of these birds may be packaged in a single crate thereby producing a significant saving in both storage and shipping space. Because the moisture and natural juices within each bird are crystallized throughout, it can be seen that the weight shrinkage for each bird is reduced since the moisture is crystallized without in any way drawing it out of the bird.

If desired, the poultry products may be easily cut up after they have been frozen in accordance with the present freezing process without any noticeable loss of moisture since the birds are not frozen stiff but will remain sufficiently pliable and flexible long before they begin to thaw. Under test observations, it has been found that the present freezing process permits retention of natural moisture within the chilled birds during as long as eight to ten days while refrigerated. At the same time, these birds may be sold in a substantially dry condition since they will remain dry in their packages at the retail outlet.

By slowly freezing the poultry products in accordance with the present technique each bird is chilled all the way to the bone without being crust frozen as with many of the prior art techniques. The ice crystals formed internally melt slowly during transit and distribution and, therefore, perform not unlike crushed ice although the aforementioned disadvantages in using crushed ice during packing are completely avoided. Also, in contrast to the various crust-freezing techniques, the birds remain frozen internally so that weepage does not occur. By contrast, weepage takes place in the prior art crust-freezing techniques before the birds are frozen so that excess moisture will eventually show up in the package upon thawing. The problem of moisture absorption must therefore be treated and extensive drip lines before packaging must be devised.

The formation of ice crystals with the present technique serves to remove heat from the carcass and, once the carcass is in the package or crate and beings to thaw, the crystals act in the same way as ice used in the ice-pack operation in preserving the birds. The internal ice simply thaws back into water so that the internal juices of the birds are used as a refrigerant during distribution.

After the dressed poultry products are removed from the standard chiller area, they are run through a drip line for a short period of time sufficient to insure that any and all water on the birds is substantially drained from the surface thereof. The poultry products then continue to be moved into the moisture-laden refrigerated chamber wherein they are blasted with air for a period of approximately 45 minutes. Here, typical ammonia-type refrigeration compressors are used to provide adequate and low cost cooling. After formation of the ice crystals the frozen birds go immediately into refrigerated trucks without the need for any additional refrigerant. Accordingly, either ice nor $CO_2$ nor special insulation of any kind is required for special handling of the birds. There is no frozen look about these poultry products, the wings and leg joints are not frozen solid, they will flex and the birds can be cut and handled in the same way as with fresh poultry.

The present system requires an air velocity of approximately 700 feet per minute within the moisture-laden chamber. The freezing coils within the chamber are maintained at approximately a 5° difference in temperature between the refrigerant and the forced air therein. Accordingly, the air is not dried out as with the use of an extremely cold system. By keeping the air as moisture-laden as possible, the poultry products may be kept from losing excessive moisture weight. By maintaining such a small difference in temperature between the refrigerant and the air, desiccating of the surface of the bird can be substantially avoided. Although this requires an extra amount of refrigeration coil, this 5° difference can be conveniently maintained so that only a small degree of moisture is removed from the birds during the present freezing process.

By avoiding the use of carbon dioxide in freezing the birds, the cost factor in accordance with this process can be substantially reduced. Besides, with the use of carbon dioxide the outside of the bird is chilled rather sharply so that the chill will merely dissipate quickly with little or no safety factor as in the present freezing process wherein the internal ice crystals serve to maintain the state of the chill.

As stated above, the natural color and appearance of the poultry product is maintained with use of the present poultry freezing process. By contrast, freezing normally tends to lighten the color of the birds while an unduly slow freezing process tends to redden the carcasses to some undesirable extent. With the present technique, on the other hand, the birds will look precisely like fresh iced poultry at the retail counter because the exterior temperature of the birds will be at 32° F. or slightly thereabove.

The present invention contemplates the use of an ammonia refrigeration system with the air blast chamber since it has proven to be the most economical of all refrigeration systems. The use of glycol, freon, liquid nitrogen, and other refrigerants are not needed. Accordingly, packaging before chilling is not required with the present technique.

The extra coiling required for the present system involves a single coil in addition to those normally provided so that one coil is always on a defrost cycle. This prevents frost build-up and eliminates any need for shutting down the plant. A programmed timer and special mechanical damper may also be provided to enable the present system to maintain its fan operation while still defrosting one coil at a time.

From the foregoing it can be seen that a simple, yet highly effective technique in freezing the poultry products has been devised with the use of ice crystals made to form throughout the poultry carcass upon freezing without sacrificing any yield or quality in the carcass appearance. The weight shrinkage is reduced, the appearance of the product is improved and the birds may be easily packaged and pre-cut since they are never frozen solid nor crust frozen.

Obviously many modifications and variations of the present invention are possible in the light of the above teachings. It is therefore to be understood that within the scope of the appended claims the invention may be practiced otherwise than as specifically described.

What is claimed is:

1. A poultry freezing process comprising the steps of: moving dressed poultry products through a drip line for a period of time sufficiently to insure that any and all water on the products is substantially drained from the surface thereof; moving said poultry products through a moisture-laden refrigeration chamber maintained at a below-freezing temperature; and slowly passing air, maintained at approximately a 5° F. difference in temperature as compared to the refrigerant of said chamber, over the poultry products at a low velocity sufficient to reduce the temperature totally throughout the poultry products to a below-freezing temperature whereby the liquids within the poultry product are crystallized therethroughout, the product remaining flexible.

2. The process according to claim 1 wherein said chamber temperature is within the range of about 15° to 25° F.

3. The process according to claim 2 wherein the poultry products are reduced to a temperature of approximately 18° to 28°F. totally throughout.

4. The process according to claim 3 wherein the poultry products are subjected to the air for a period of from about 30 to 90 minutes.

* * * * *